United States Patent [19]

Wargo et al.

[11] Patent Number: 5,507,948
[45] Date of Patent: Apr. 16, 1996

[54] COFFEE FILTER SUPPORT RING

[76] Inventors: David G. Wargo; Susan B. Wargo, both of 1517 E. First St., Streator, Ill. 61364

[21] Appl. No.: 440,891

[22] Filed: May 15, 1995

[51] Int. Cl.⁶ .................................................. B01D 29/085
[52] U.S. Cl. ............................ 210/479; 210/482; 99/305; 99/306
[58] Field of Search ...................... 210/474, 477, 210/478, 479, 481, 482; 99/295, 306, 279, 275, 305

[56]  References Cited

U.S. PATENT DOCUMENTS

| | | | |
|---|---|---|---|
| 4,656,932 | 4/1987 | Kopp | 210/474 |
| 4,728,425 | 3/1988 | Sandvig | 210/479 |
| 4,735,719 | 4/1988 | Benedict | 99/295 |
| 4,865,737 | 9/1989 | McMichael | 99/295 |
| 4,963,262 | 10/1990 | Johnstone | 210/477 |
| 5,176,830 | 1/1993 | Wiggins | 210/482 |
| 5,252,211 | 10/1993 | Searfoss, Jr. | 210/474 |
| 5,290,444 | 3/1994 | Campbell | 210/477 |

*Primary Examiner*—W. L. Walker
*Attorney, Agent, or Firm*—Hugh E. Smith

[57] ABSTRACT

A ring for supporting a coffee filter within a filter basket of a brewing device. The inventive device includes a support ring positionable within a filter basket so as to capture an upper edge of a coffee filter between the ring and the basket. A plurality of vertical stanchions depend from the support ring for engaging a bottom of the basket to support the ring at a desired position therein. An adjustment assembly is provided for varying a diameter of the ring and each stanchion includes frangible notches permitting sizing of the stanchions to a desired height.

5 Claims, 3 Drawing Sheets

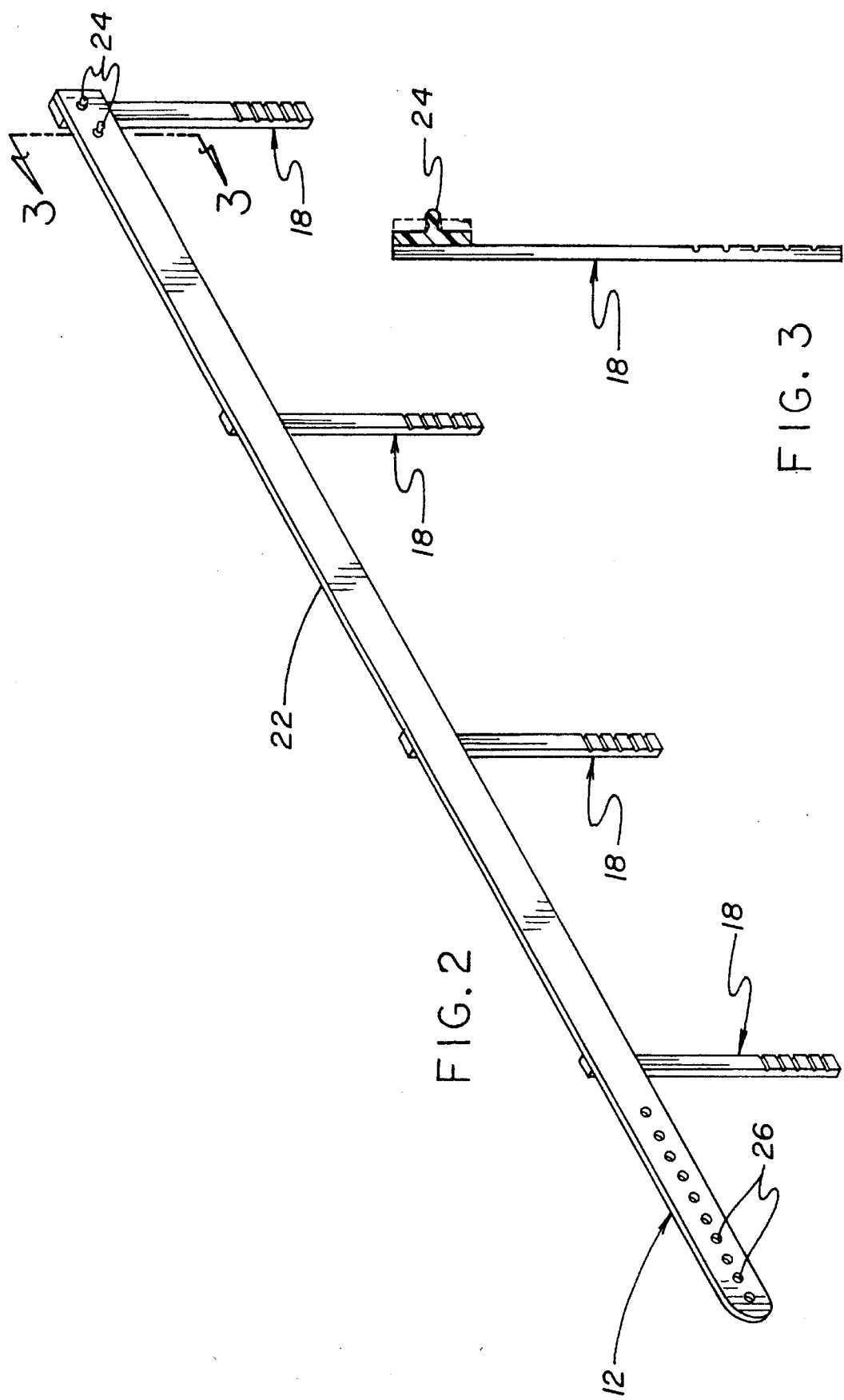

COFFEE FILTER SUPPORT RING

BACKGROUND OF THE INVENTION

1. Field of the Invention

The present invention relates to support devices and more particularly pertains to an coffee filter support ring for supporting a coffee filter within a filter basket of a brewing device.

2. Description of the Prior Art

The use of support devices is known in the prior art. More specifically, support devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art support devices include U.S. Pat. No. 5,252,211; U.S. Pat. No. 5,176,830; U.S. Pat. No. 4,865,737; U.S. Pat. No. 4,981,588; U.S. Pat. No. 4,963,262; and U.S. Pat. Des. No. 250,445.

While these devices fulfill their respective, particular objectives and requirements, the aforementioned patents do not disclose a coffee filter support ring for supporting a coffee filter within a filter basket of a brewing device which includes a support ring positionable within a filter basket so as to capture an upper edge of a coffee filter between the ring and the basket, a plurality of vertical stanchions depending from the support ring for engaging a bottom of the basket to support the ring at a desired positioned therein, and an adjustment assembly for varying a diameter of the ring, with each stanchion including frangible notches permitting sizing of the stanchions to a desired height.

In these respects, the coffee filter support ring according to the present invention substantially departs from the conventional concepts and designs of the prior art, and in so doing provides an apparatus primarily developed for the purpose of supporting a coffee filter within a filter basket of a brewing device.

SUMMARY OF THE INVENTION

In view of the foregoing disadvantages inherent in the known types of support devices now present in the prior art, the present invention provides a new coffee filter support ring construction wherein the same can be utilized for supporting a coffee filter within a filter basket of a brewing device. As such, the general purpose of the present invention, which will be described subsequently in greater detail, is to provide a new coffee filter support ring apparatus and method which has many of the advantages of the support devices mentioned heretofore and many novel features that result in a coffee filter support ring which is not anticipated, rendered obvious, suggested, or even implied by any of the prior art support devices, either alone or in any combination thereof.

To attain this, the present invention generally comprises a ring for supporting a coffee filter within a filter basket of a brewing device. The inventive device includes a support ring positionable within a filter basket so as to capture an upper edge of a coffee filter between the ring and the basket. A plurality of vertical stanchions depend from the support ring for engaging a bottom of the basket to support the ring at a desired position therein. An adjustment assembly is provided for varying a diameter of the ring and each stanchion includes frangible notches permitting sizing of the stanchions to a desired height.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the component is set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new coffee filter support ring apparatus and method which has many of the advantages of the support devices mentioned heretofore and many novel features that result in a coffee filter support ring which is not anticipated, rendered obvious, suggested, or even implied by any of the prior art support devices, either alone or in any combination thereof.

It is another object of the present invention to provide a new coffee filter support ring which may be easily and efficiently manufactured and marketed.

It is a further object of the present invention to provide a new coffee filter support ring which is of a durable and reliable construction.

An even further object of the present invention is to provide a new coffee filter support ring which is susceptible of a low cost of manufacture with regard to both materials and labor, and which accordingly is then susceptible of low prices of sale to the consuming public, thereby making such coffee filter support rings economically available to the buying public.

Still yet another object of the present invention is to provide a new coffee filter support ring which provides in the apparatuses and methods of the prior art some of the advantages thereof, while simultaneously overcoming some of the disadvantages normally associated therewith.

Still another object of the present invention is to provide a new coffee filter support ring for supporting a coffee filter within a filter basket of a brewing device.

Yet another object of the present invention is to provide a new coffee filter support ring which includes a support ring positionable within a filter basket so as to capture an upper edge of a coffee filter between the ring and the basket, a plurality of vertical stanchions depending from the support ring for engaging a bottom of the basket to support the ring at a desired positioned therein, and an adjustment assembly for varying a diameter of the ring, with each stanchion including frangible notches permitting sizing of the stanchions to a desired height.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an isometric illustration of the present invention in an unfolded orientation.

FIG. 3 is a cross sectional view taken along line 303 of FIG. 2.

DESCRIPTION OF THE PREFERRED EMBODIMENT

Figure 1:
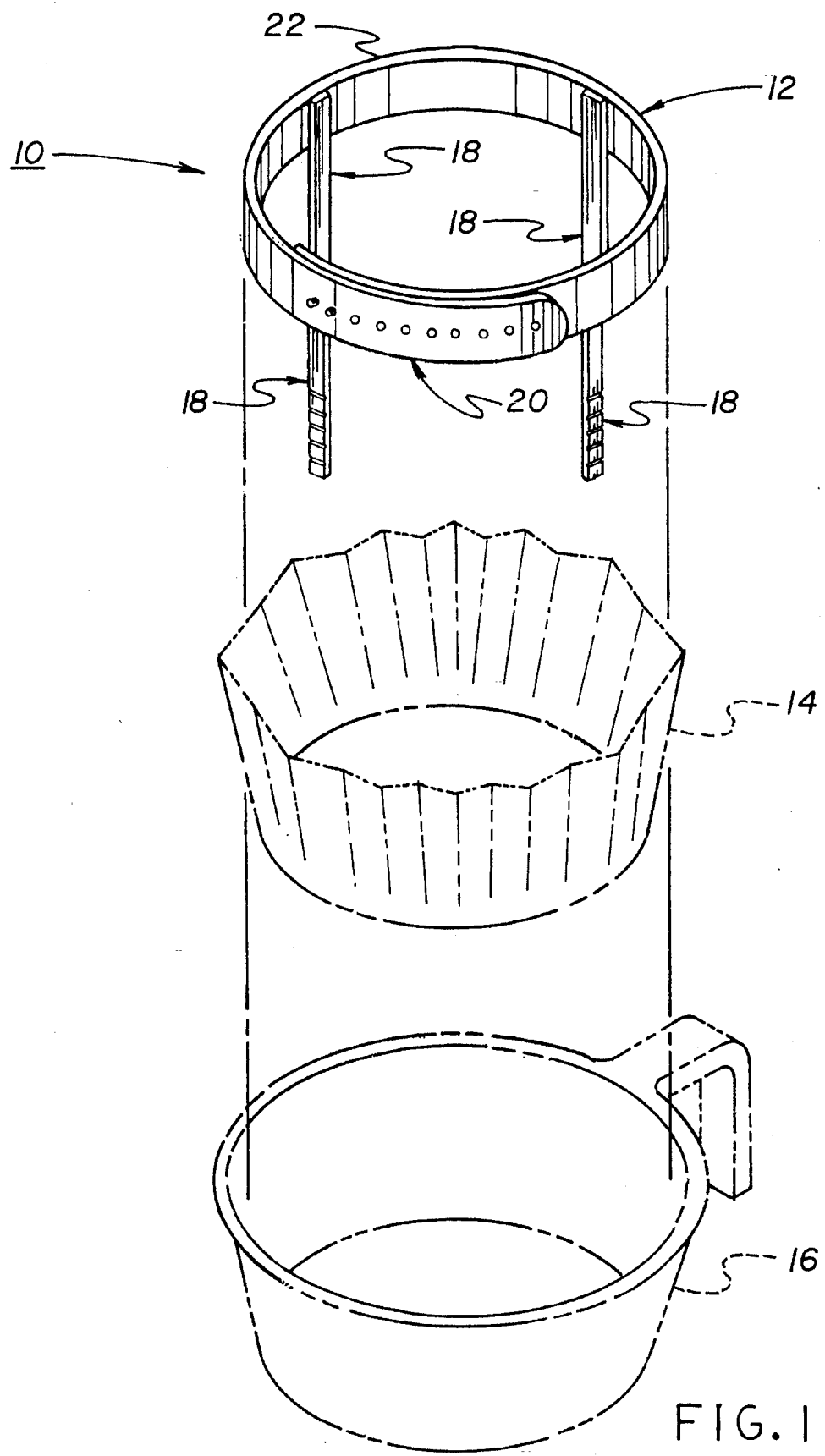
FIG. 1 is an isometric illustration of a coffee filter support ring as positioned for insertion within a coffee filter and a filter basket.

With reference now to the drawings, and in particular to FIGS. 1–5 thereof, a new coffee filter support ring embodying the principles and concepts of the present invention and generally designated by the reference numeral 10 will be described.

More specifically, it will be noted that the coffee filter support ring 10 comprises a support means 12 positionable within a coffee filter 14 nested within a filter basket 16 of an unillustrated brewing device for capturing the coffee filter between the support means and the basket. A plurality of vertical stanchions 18 depend from the support means 12 and operate for engaging a bottom surface of the interior of the basket 16 so as to maintain the support means 12 at a desired height within the basket. By this structure, a coffee filter 14 is precluded from deforming during a brewing process so as to preclude egress of ground coffee therefrom during the brewing.

Preferably, the present invention further comprises an adjustment means 20 for selectively adjusting a diameter of the support means 12, as shown in FIG. 1 of the drawings. To this end, the support means 12 preferably comprises a resilient strip 22 of elongated configuration which is normally substantially straight as shown in FIG. 2 of the drawings. At least one securing projection 24 projects from a first end of the elongated resilient strip 22 and is operable to be engaged to one of a plurality of securing apertures 26 directed through the second end of the resilient strip 22. By this structure, a circumference of the securing means 12 can be selectively varied through a placement of the securing projection 24 into a desired one of the securing apertures 26 so as to subsequently vary a diameter of the support means 12 to adjust the device 10 to a particular filter basket 16.

Figure 4:
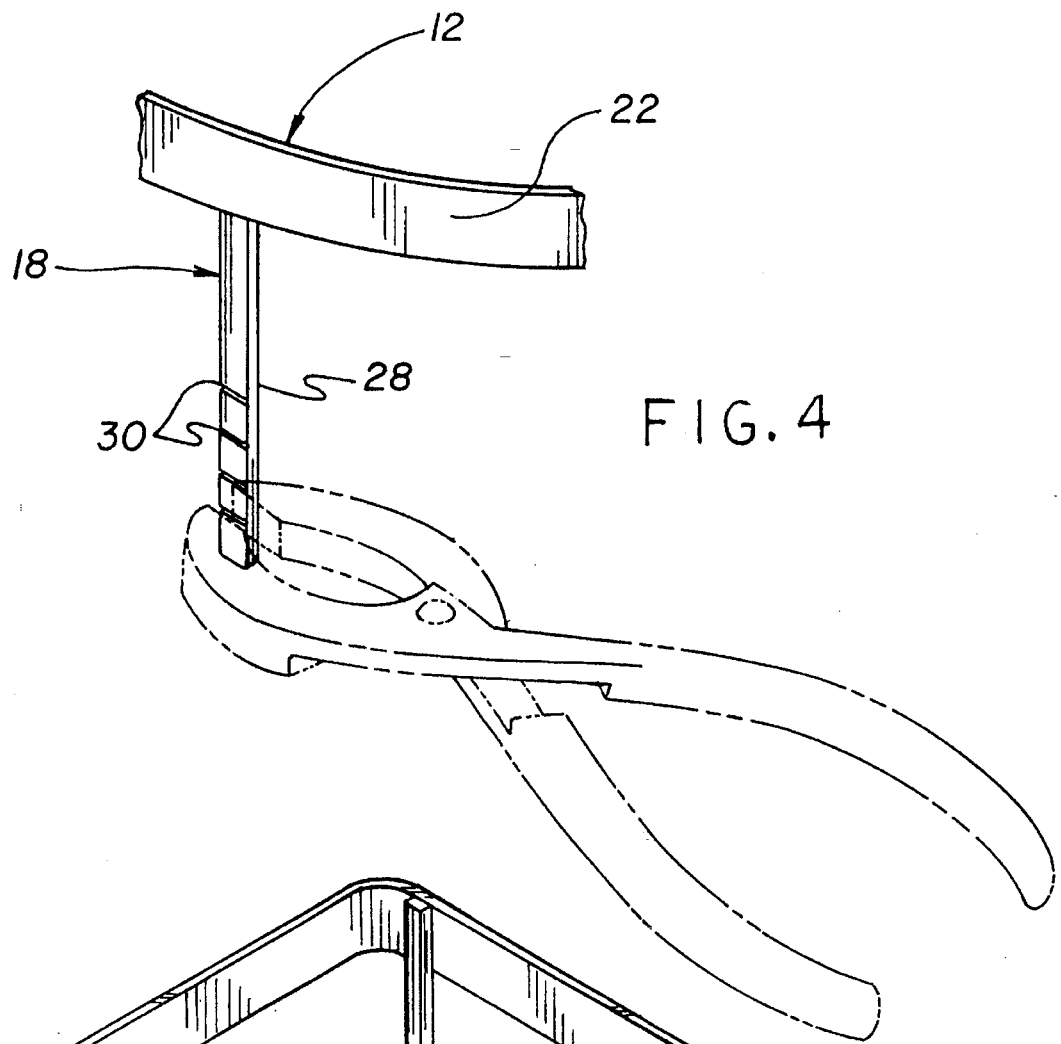
FIG. 4 is an enlarged isometric illustration of a portion of the present invention.

As best illustrated in FIGS. 2 through 4, it can be shown that each of the vertical stanchions 18 of the present invention 10 preferably comprises a flexible depending member 28 which is integrally or otherwise secured to the flexible strip 22 of the support means 12 so as to extend substantially orthogonally therefrom relative to a longitudinal length of the flexible strip. Each of the flexible depending members 28 of the vertical stanchions 18 is shaped so as to define a plurality of spaced and parallel frangible notches 30 directed thereinto which permit a selective fracturing of a portion of the flexible depending member 28 from a major portion thereof. By this structure, a pair of pliers or other tool, as shown in FIG. 4, can be utilized to effect fracturing of the flexible depending member 28 at a desired one of the frangible notches 30 so as to customize a length of the vertical stanchions 18. Such configuration of structure allows the support means 12 to be positioned at a desired height within a particular filter basket 16 of an associated brewing device.

Figure 5:
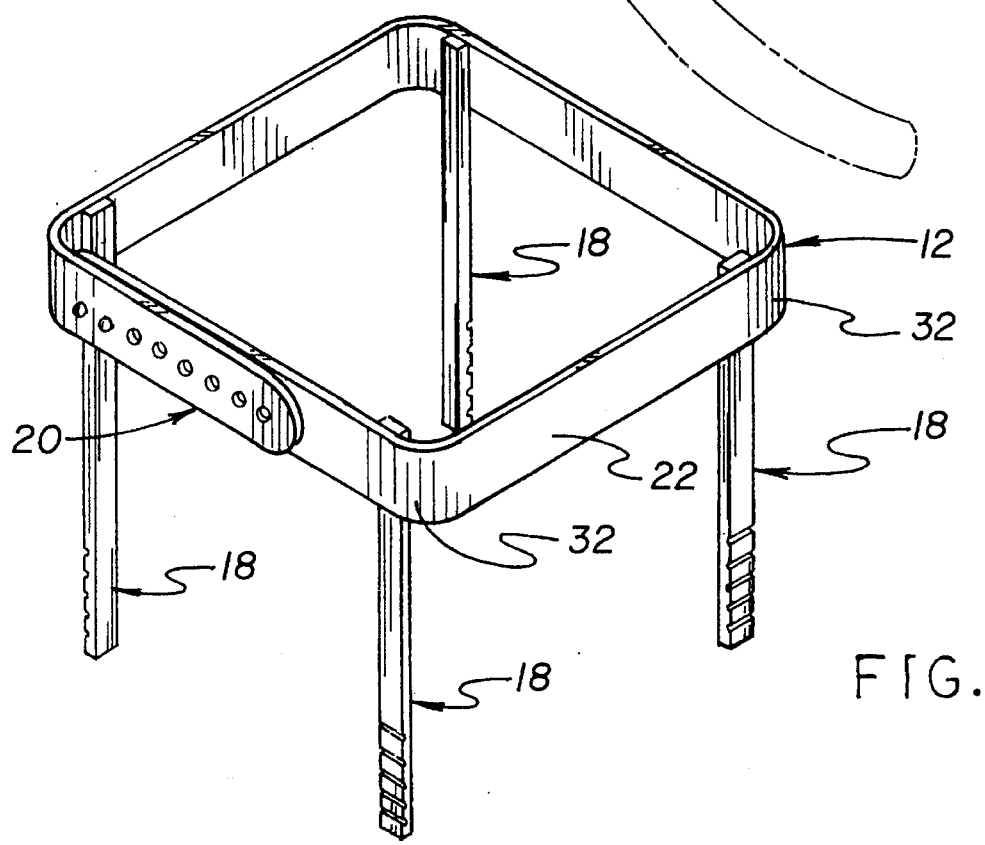
FIG. 5 is an isometric illustration of an alternative form of the present invention.

As shown in FIG. 5, an alternative form of the present invention 10 includes a plurality of integral bends 32 formed into the flexible strip 22 of the support means 12 so as to cause the support means to assume a substantially rectangular or square configuration. The adjustment means 20 thus permits the support means 12 of the alternative form of the present invention 10 to be adjusted into a variety of four-sided polygonal shapes to accommodate a shape of an associated filter basket 16 to which the device 10 is to be associated.

In use, the coffee filter support ring 10 according to the present invention can be easily utilized for supporting a coffee filter within a filter basket of a brewing device. The present invention 10 substantially eliminates a possibility of the filter 14 collapsing along a side wall thereof which would permit an egress of ground coffee from the filter and subsequent entry of such ground coffee into a pot of brewed coffee positioned therebeneath.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A coffee filter support ring comprising:

a support means positionable within a coffee filter nested within a filter basket for capturing the coffee filter between the support means and the basket;

a plurality of vertical stanchions depending from the support means for engaging a bottom surface of the interior of the basket so as to maintain the support means at a desired height within the basket;

an adjustment means for selectively adjusting a diameter of the support means, wherein the support means comprises an elongated resilient strip having a plurality of securing apertures directed through a second end thereof; and further wherein the adjustment means comprises at least one securing projection extending from a first end of the elongated resilient strip, the securing projection being positioned through one of the plurality of securing apertures directed through the second end of the resilient strip;

wherein each of the vertical stanchions comprises a flexible depending member secured to the flexible strip of the support means so as to extend substantially orthogonally therefrom relative to a longitudinal length of the flexible strip;

wherein each of the flexible depending members of the vertical stanchions is shaped so as to define a plurality of spaced and parallel frangible notches directed thereinto which permit a selective fracturing of a portion of the flexible depending member from a major portion thereof.

2. The coffee filter support ring of claim 1, wherein the flexible strip includes a plurality of integral bends formed thereinto so as to cause the support means to assume a substantially square configuration.

3. A coffee filter support ring comprising:

a filter basket;

a coffee filter nested within the filter basket;

a support means positionable within the coffee filter nested within the filter basket for capturing the coffee filter between the support means and the basket;

a plurality of vertical stanchions depending from the support means and engaging a bottom surface of the coffee filter so as to maintain the support means at a desired height within the basket;

an adjustment means for selectively, adjusting a diameter of the support means;

wherein the support means comprises an elongated resilient strip having a plurality of securing apertures directed through a second end thereof; and further wherein the adjustment means comprises at least one securing projection extending from a first end of the elongated resilient strip, the securing projection being positioned through one of the plurality of securing apertures directed through the second end of the resilient strip;

wherein each of the vertical stanchions comprises a flexible depending member secured to the flexible strip of the support means so as to extend substantially orthogonally therefrom relative to a longitudinal length of the flexible strip;

wherein each of the flexible depending members of the vertical stanchions is shaped so as to define a plurality of spaced and parallel frangible notches directed thereinto which permit a selective fracturing of a portion of the flexible depending member from a major portion thereof.

4. The coffee filter support ring of claim 3, wherein the flexible strip includes a plurality of integral bends formed thereinto so as to cause the support means to assume a substantially square configuration.

5. A coffee filter support ring comprising:

a support means positionable within a coffee filter nested within a filter basket for capturing the coffee filter between the support means and the basket;

a plurality of vertical stanchions depending from the support means for engaging a bottom surface of the interior of the basket so as to maintain the support means at a desired height within the basket, each of the vertical stanchions comprising a flexible depending member secured to the support means so as to extend substantially orthogonally therefrom, with each of the flexible depending members of the vertical stanchions being shaped so as to define a plurality of spaced and parallel frangible notches directed thereinto which permit a selective fracturing of a portion of the flexible depending member from a major portion thereof.

* * * * *